United States Patent [19]

Murata et al.

[11] Patent Number: 4,939,785
[45] Date of Patent: Jul. 3, 1990

[54] RADIO COMMUNICATION NETWORK SYSTEM COMPRISING A CONNECTING EQUIPMENT UNIT OPERABLE IN DIFFERENT MODES

[75] Inventors: Yoshitoshi Murata; Masahiko Hirono; Toshihiko Shibata; Fumio Suzuki; Mitsuo Sato, all of Kanagawa; Tadao Hashimoto, Tokyo, all of Japan

[73] Assignees: Nippon Telegraph and Telephone Corp., Tokyo; Matsushita Communication Industrial Co., Ltd., Kanagawa; NEC Corp., Tokyo, all of Japan

[21] Appl. No.: 200,101

[22] Filed: May 31, 1988

[30] Foreign Application Priority Data

May 29, 1987 [JP] Japan ................................ 62-131856
Jul. 20, 1987 [JP] Japan ................................ 62-180475

[51] Int. Cl.$^5$ ......................... H04B 1/38; H04M 1/72
[52] U.S. Cl. ........................................ 455/54; 455/34; 455/58; 379/61; 379/63
[58] Field of Search ....................... 455/33, 34, 54, 56, 455/53, 58; 379/59, 60, 63, 61, 62

[56] References Cited

U.S. PATENT DOCUMENTS

| | | | |
|---|---|---|---|
| 4,242,538 | 12/1980 | Ito et al. ................................ | 455/33 |
| 4,654,879 | 3/1987 | Goldman et al. ....................... | 455/34 |
| 4,741,019 | 4/1988 | Takahashi ........................... | 379/63 X |
| 4,768,218 | 8/1988 | Yorita ................................. | 379/63 X |
| 4,776,001 | 10/1988 | Murata et al. ....................... | 379/63 X |

Primary Examiner—Benedict V. Safourek
Assistant Examiner—Ralph E. Smith
Attorney, Agent, or Firm—Sughrue, Mion, Zinn, Macpeak & Seas

[57] ABSTRACT

In a radio communication network system for use in carrying out communication with a plurality of radio telephone sets in a service zone by the use of a control channel and a plurality of speech channels, a connecting equipment unit (CE) is selectively operable in cooperation with a radio control unit (RCU) in a speech mode of forming a speech path through a selected one of the speech channels and an additional mode of selectively monitoring the control and the speech channels. The additional mode may be divided into first and second control modes for allowing and rejecting reception of a call with the control channel monitored, respectively. Alternatively, either a rest mode or a combination of rest and initial program loading modes may be added to the additional mode. A plurality of the connecting equipment units may be located in a single service zone and selectively put into the speech and the additional modes with only one of the connecting equipment units kept in the first control mode.

12 Claims, 11 Drawing Sheets

| S1 | | | S2 | | | S3 | |
|---|---|---|---|---|---|---|---|
| CE NO. | MODE | | CE NO. | MODE | | CE NO. | MODE |
| 231 | M1 | | 231 | M3 | | 231 | M3 |
| 232 | M2 | | 232 | M1 | | 232 | M2 |
| 233 | M2 | | 233 | M2 | | 233 | M1 |
| 234 | M2 | | 234 | M2 | | 234 | M2 |

RADIO COMMUNICATION NETWORK SYSTEM COMPRISING A CONNECTING EQUIPMENT UNIT OPERABLE IN DIFFERENT MODES

BACKGROUND OF THE INVENTION

This invention relates to a control or fixed station which is for use in a radio telephone network system to carry out communication between the control station and a plurality of movable radio telephone sets, such as cordless telephone sets or mobile telephone sets.

A conventional radio telephone network system of the type described comprises a control station which is connected to a private branch exchange (abbreviated to a PBX) or another exchange. The control station serves to communicate within a preassigned service zone through radio channels with a plurality of radio telephone sets, each of which is movable over the service area. The radio channels are divided into a control channel for control operation and a plurality of speech channels for transmission of speech signals.

More particularly, the control station comprises a radio connecting equipment section or group (CEG) for selectively coupling the radio telephone sets through the radio channels and a radio control unit (RCU) between the exchange and the radio connecting section.

A proposal has recently been made about arranging or locating a plurality of connecting equipment units (CE) as the radio connecting section in a common service zone. In this event, a preselected one of the connecting equipment units is operable in the service zone as a control equipment unit for monitoring the control channel to process an originating call and a terminating call and to indicate the speech channels while the other connecting equipment units are operable as speech equipment units for forming speech paths through the indicated speech channels. Thus, the control equipment unit and the speech equipment units are determined in the service zone without being spatially and temporally changed. At any rate, such an arrangement of the connecting equipment units enables communication of each radio telephone set through any one of the connecting equipment units no matter where each radio telephone set is present in the service zone.

However, a plurality of the connecting equipment units should be arranged in the service zone even when traffic is not very heavy. This means that superfluous facilities must be installed in the control station. Therefore, the control station inevitably becomes expensive.

On the other hand, consideration might be made about controlling each connecting equipment unit in a time division fashion to monitor the control channel and to switch the control channel to a selected one of the speech channels. Such monitoring and switching operations of each connecting equipment unit may dispense with superfluous facilities in the control station.

However, it often happens that none of the connecting equipment units transiently monitor the control channel in the control station in question, with all the connecting equipment units switched to the speech channels. Under the circumstances, a call might take place from the exchange or at least one of the radio telephone sets while none of the connecting equipment units monitor the control channel. This results in prolongation of a response to the call in the control station because each connecting equipment unit can not quickly respond to the call.

SUMMARY OF THE INVENTION

It is an object of this invention to provide a control station which is for use in a radio communication network system and which is inexpensive because superfluous facilities are unnecessary when traffic is not very heavy.

It is another object of this invention to provide a control station which is for use in a radio communication network system and which is capable of quickly responding to of a call.

It is still another object of this invention to provide a control station of the type described, which can always monitor a control channel without any interruption of monitoring the control channel.

According to a first aspect of this invention, there is provided a control station for use in processing a call in a radio communication network system to carry out communication with a radio telephone set movable in a service area defined by the control station, with a control radio channel and a plurality of speech radio channels preassigned to the control station. The control station comprises first means selectively operable in first and second control modes and a speech mode for selectively accessing the control and the speech radio channels to allow reception of the call in the first control mode, not to allow the reception of the call in the second control mode, and to form a speech path through a selected one of the speech channels in the speech mode and second means coupled to the first means for successively controlling the first means to switch either one of the first and the second control modes and the speech mode to another.

According to a second aspect of this invention, there is provided a control station which comprises radio channel connecting means selectively operable in a speech mode and an additional mode for selectively accessing the control and the speech radio channels to carry out communication through a selected one of the speech radio channels in the speech mode and to carry out an additional operation in the additional mode and control means coupled to the radio channel connecting means for successively controlling the radio channel connecting means to select one of the speech and the additional modes.

According to a third aspect of this invention, there is provided a radio communication network system for use in processing a call to carry out communication with a plurality of radio telephone sets in a predetermined service zone through a speech path formed by the use of a control radio channel and a plurality of speech radio channels. The radio communication network system comprises a plurality of connecting equipment units which are located in the predetermined service zone and each of which is selectively operable in a speech mode of forming the speech path and in an additional mode different from the speech mode and control means coupled to the connecting equipment units for controlling the connecting equipment units to selectively put into the speech and the additional modes.

DESCRIPTION OF THE PREFERRED EMBODIMENTS

Figure 1:
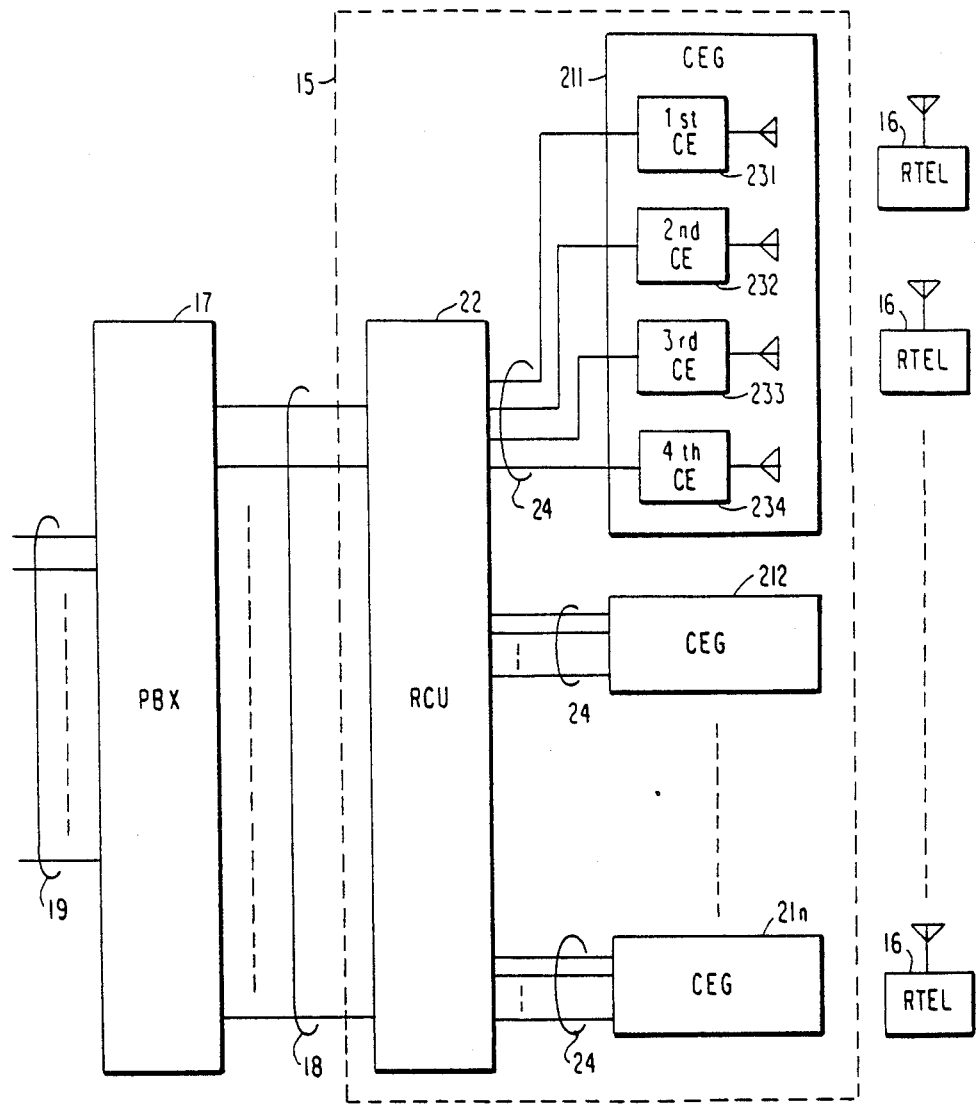
FIG. 1 is a block diagram of a radio communication network system according to a first embodiment of this invention.

Referring to FIG. 1, a radio communication network system according to a first embodiment of this invention is used as a cordless telephone network system and comprises a control station 15 and a plurality of radio telephone sets (RTEL) 16 which are cordless telephone sets. In FIG. 1, the control station 15 is connected to a private branch exchange (PBX) 17 through a plurality of local lines 18. The private branch exchange 17 is further connected to another exchange (not shown) through a plurality of external lines 19.

The illustrated control station 15 comprises first through n-th radio connecting sections or groups (CEG) 21*l* to 21*n* and a radio control unit (RCU) 22 intermediate between the private branch exchange 17 and the respective radio connecting sections 21*l* to 21*n*, where n is a natural number. Herein, it is to be noted that the first through n-th radio connecting sections 21*l* to 21*n* define first through n-th service zones, respectively, and are communicable with the radio telephone sets 16 in the respective service zones by the use of radio channels which are composed of a control radio channel and a plurality of speech radio channels. The control and the speech radio channels may simply be called control and speech channels, respectively. The control channel will simply be abbreviated as a C—CH and is used for transmitting a wide variety of control signals which will become clear as the description proceeds while the speech channels will simply be referred to as S—CH and are used for transmitting speech or voice signals. For the time being, it suffices to say that the control signals are transmitted and received between the control station 15 and each radio telephone set 16 when an originating call is issued from each radio telephone set 16 or when a terminating call arrives at the control station 15. In addition, each of the first through n-th service zones may be as wide as a factory or each floor of a building and may have a radius between 30 m and 100 m.

As exemplified in the block of the radio connecting section 21*l*, each of the radio connecting sections 21 (suffixes omitted) comprises first through i-th connecting equipment units (CE) 23*l* to 23*i*, respectively, where i is a natural number and may be equal, for example, to four, as shown in FIG. 1. Thus, a plurality of the connecting equipment units 21 may be located within a common service zone. At any rate, the connecting equipment units 23*l* to 23*i* are connected to the radio control unit 22 through internal lines 24.

Figures 2, 3:
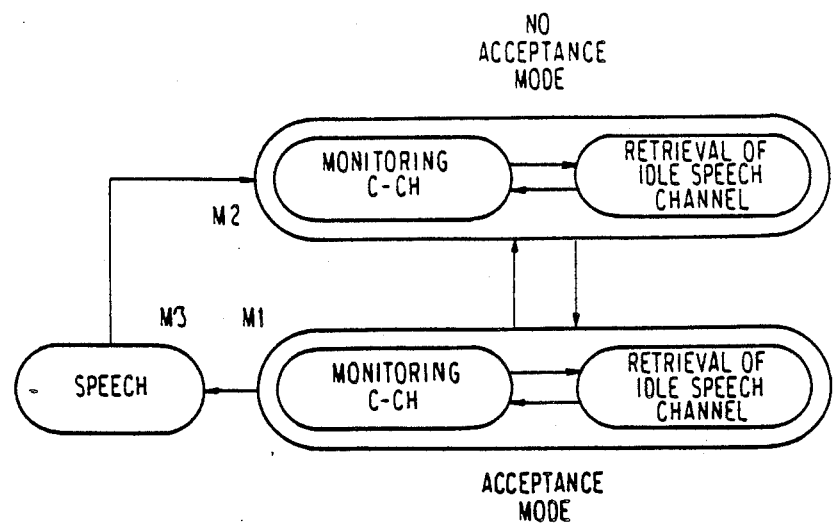
FIG. 2 is a state transition diagram for use in describing operation of each of connecting equipment units illustrated in the radio communication network system of FIG. 1.
FIG. 3 is a flow chart for use in describing states of the connecting equipment units shown in FIG. 1.

Referring to FIG. 2 together with FIG. 1, each connecting equipment unit 23 (suffix omitted) is operable in first, second, and third modes M1, M2, and M3 different from one another in response to a mode control signal which is given from the radio control unit 22 and which is indicative of each mode of the connecting equipment units 23.

The first mode M1 is for monitoring the control channel (C—CH) to allow or accept reception of each call by carrying out call processing. During the first mode M1, the speech channels (S—CH) are also monitored to detect or retrieve an idle one of the speech channels from time to time at a predetermined period of, for example, 100 milliseconds. Such an idle speech channel may be renewed at every predetermined period of, for example, 6 minutes. The connecting equipment unit 23 produces an allowance signal indicative of allowance of reception of each call. Accordingly, the first mode may be referred to as a first control mode or an allowance mode of allowing reception of each call by retrieving the control channel The second mode M2 is for monitoring the control channel (C—CH) on condition that none of calls are allowed or accepted by the connecting equipment unit 23. As a result, the connecting equipment unit 23 never carries out call processing during the second mode M2 and does not produce the allowance signal indicative of allowance of reception of a call, although an idle one of the speech channels (S—CH) is monitored in the second mode M2 like in the first mode. Therefore, the second mode M2 is similar to the first mode M1 except that no allowance signal is produced in the second mode M2. This shows that the connecting equipment unit 23 detects or recognizes an idle speech channel during the second mode M2, though a call itself is never processed in the connecting equipment unit 23 during the second mode M2 even when the call appears in the second mode M2. In this connection, the second mode M2 may be called a standby mode of call processing or a second control mode.

The third mode M3 is for transmitting a speech signal through a selected one of the speech channels and may be named a speech mode.

In the illustrated example, the connecting equipment unit 23 can change the first through third modes M1 to M3 from one another in response to the mode control signal given from the radio control unit 22. Specifically, the first mode M1 can be switched to either the third mode M3 or the second mode M2 while the third mode M3 is shifted to the second mode M2. In this event, the third mode M3 may be quickly switched to the first mode M1 through the second mode M2.

Referring to FIG. 3 in addition to FIGS. 1 and 2, the first through fourth connecting equipment units 231 to 234 are controlled by the radio control unit 22 in a manner illustrated in FIG. 3. More specifically, combinations of the modes in the first through fourth connecting equipment units 231 to 234 are shown as first through third states S1 to S3 in FIG. 3, respectively. It is assumed in FIG. 1 that the first state S1 is shifted to the second state S2 which is followed by the third state S3.

In the first state S1, the first connecting equipment unit 231 alone is put into the first mode M1, namely, the allowance mode while each of the remaining second through fourth connecting equipment units 232 to 234 are put into the second mode M2, namely, the standby mode. Accordingly, none of the first through fourth connecting equipment units 231 to 234 become the third or speech mode M3 in the first state S1. Thus, only one of the connecting equipment units always monitors the control channel in each radio connecting section 21l to 21n in the radio communication network system illustrated in FIG. 1.

Under the circumstances, assume that an originating call is issued from one of the radio telephone sets 16 located in the service zone of the first radio connecting section 211. The first state S1 is switched to the second state S2 wherein the first connecting equipment unit 231 comes to the speech mode (M3) while the second connecting equipment unit 232 is switched from the second or standby mode M2 to the first or allowance mode M1 with the third and the fourth connecting equipment units 233 and 234 kept in the second mode M2. Thus, communication is started through the first connecting equipment unit 231. When the predetermined interval of time lapses, the second state S2 is changed to the third state S3 and the third connecting equipment unit 233 becomes the first mode M1 instead of the second connecting equipment unit 232 with the fourth connecting equipment unit 234 kept in the second mode M2. Similar operation is successively carried out in the first through fourth connecting equipment units 231 to 234 under control of the radio control unit 22.

With this structure, it is possible to quickly switch each connecting equipment unit 23 from the second or standby mode M2 to the first or allowance mode M1 because the control channel is previously monitored in the second mode M2 prior to transition to the first mode M1. In addition, each of the connecting equipment units 23 is selectively put into the second mode M2 if no communication is carried out therethrough. This implies that the illustrated system can continuously carry out a normal operation even when malfunction takes place in one or ones of the connecting equipment units.

Thus, each connecting equipment unit 23 may be called a first circuit which is operable in a selected one of the first through third modes M1 to M3 while the radio control unit 22 may be called a second circuit which serves to control the first circuit.

Figure 4:
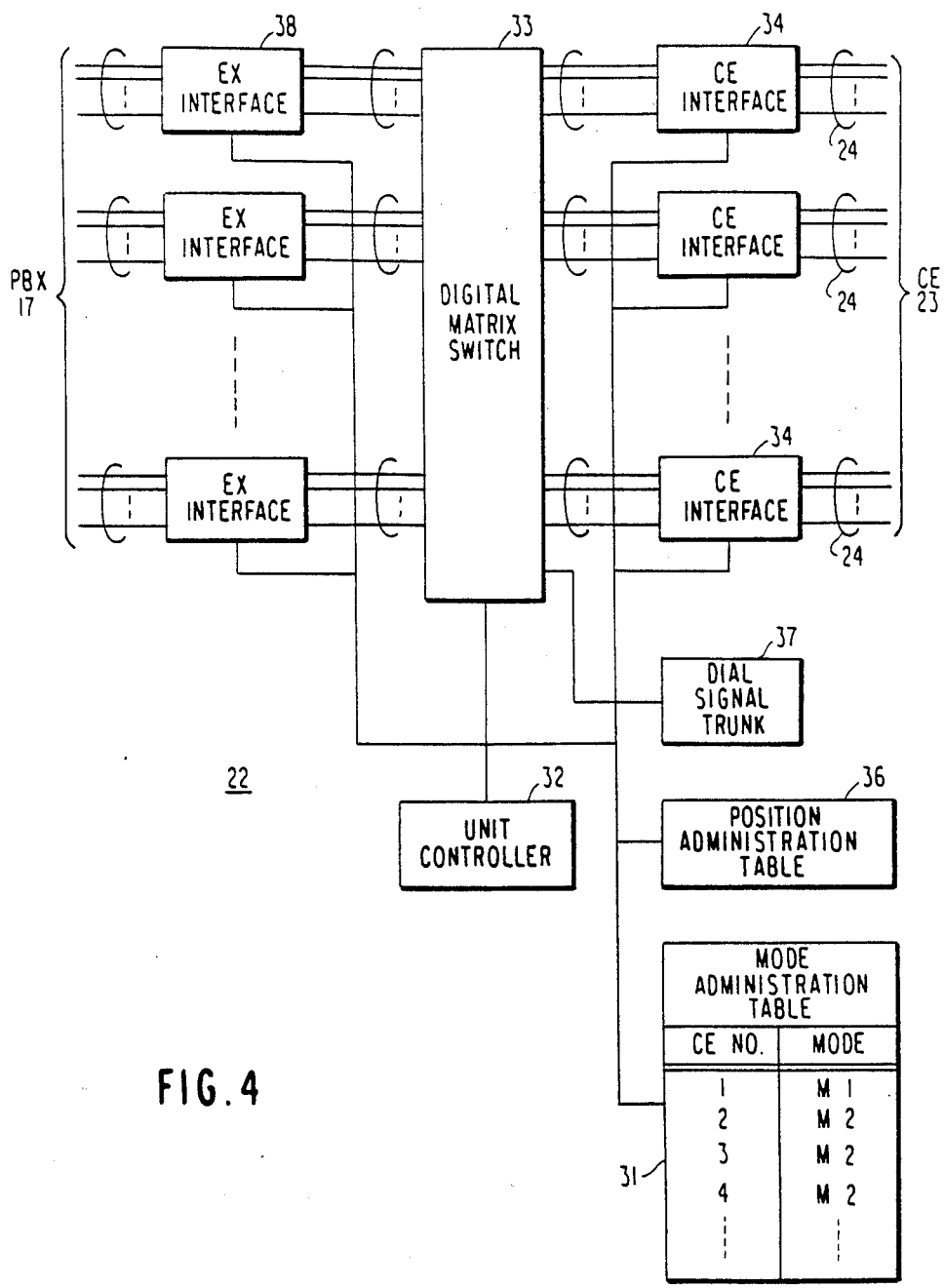
FIG. 4 is a block diagram of a radio control unit illustrated in FIG. 1.

Referring to FIG. 4, the radio control unit (RCU) 22 illustrated in FIG. 1 is for use in putting the connecting equipment units 23 into operation in the above-mentioned manner. For this purpose, the radio control unit 22 comprises a mode administration table 31 which may be a random access memory. The mode administration table 31 is accessed by a unit controller 32 which may be a combination of a microprocessor, a random access memory, and a read-only memory. The illustrated unit controller 32 may comprise a timer for monitoring the predetermined interval of time. The mode administration table 31 has a plurality of addresses which are in one-to-one correspondence to the connecting equipment units shown in FIG. 1 and at which the modes of the connecting equipment units are memorized under control of the unit controller 32. In this connection, a first one of the addresses is loaded with a first mode data signal representative of the first mode M1 in the first state S1 illustrated in FIG. 3 while second through fourth ones of the addresses are loaded with a second mode data signal representative of the second mode M2.

Each of the mode data signals is read out of the mode administration table 31 under control of the unit controller 32 to be delivered as the mode control signal through a digital matrix switch 33 and a corresponding one of connecting equipment unit (CE) interfaces 34 to each connecting equipment unit 23. The CE interfaces 34 may be formed by a hybrid transformer for coupling a four-wire line to a two-wire line.

In addition, the radio control unit 22 comprises a position administration table 36, a dial signal trunk 37 for generating a dial signal and a plurality of exchange (EX) interfaces 38 connected to the private branch exchange 17 (FIG. 1). The position administration table 36 is for registering each position of the radio telephone sets 16 in a manner to be described later in one-to-one correspondence to a service zone determined by the connecting equipment units 23. Such registration of each position is possible by monitoring which one of the connecting equipment units 23 is used on occurrence of a call. The remaining dial signal trunk 37 and EX interfaces 38 are known in the art and will therefore not be described any longer.

Figure 5:
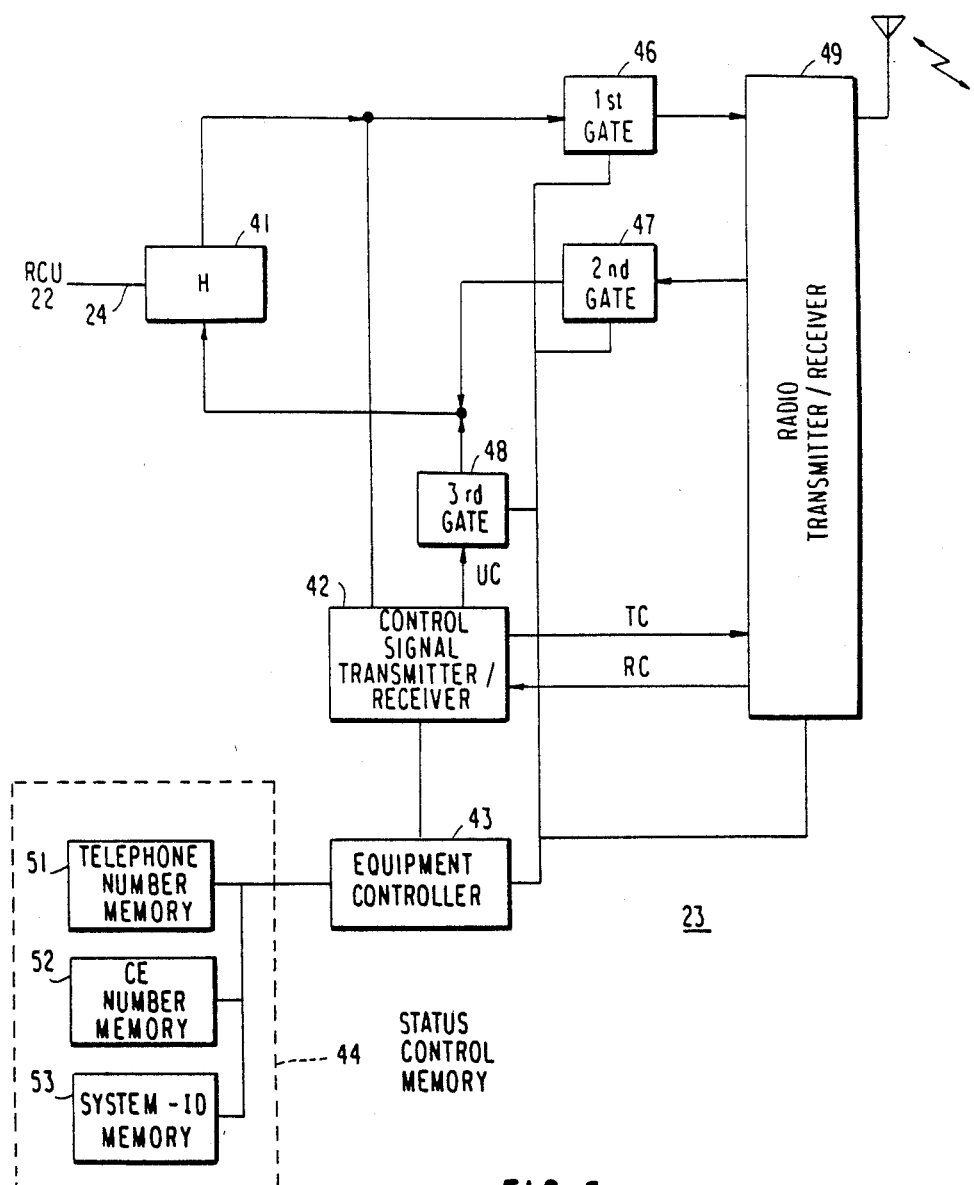
FIG. 5 is a block diagram of a connecting equipment unit illustrated in FIG. 1.

Referring to FIG. 5, the connecting equipment unit 23 illustrated in FIG. 1 is operable in response to the mode control signal given from the radio control unit 24 so as to carry out the operation mentioned in conjunction with FIGS. 1, 2, and 3. The illustrated connecting equipment unit 23 comprises a hybrid transformer 41 between a two-wire line extended from the radio control unit 22 and a four-wire internal line inside of the connecting equipment unit 23. The four-wire internal line is divisible into a downstream line and an upstream line directed from and to the radio control unit 22, respectively. The downstream line is connected to a control signal transmitter/receiver 42 which is coupled to an equipment unit controller 43 to transmit or receive various kinds of control signals to be described later. The equipment unit controller 43 may be a combination of a microprocessor, a random access memory, and a read-only memory like the unit controller 32 and is coupled to a status control memory or storage 44, first through third gates 46, 47, and 48, and a radio transmitter/receiver 49 through control lines. The first gate 46 is placed in the downstream line to selectively send a transmission speech signal to the radio transmitter/receiver 49 while the second gate 47 is located in the upstream line to transmit a reception speech signal towards the radio control unit 22. The first and the second gates 46 and 47 are operable to selectively form a speech path. A combination of the control signal transmitter/receiver 42 and the connecting equipment unit 43 may be referred to as a mode control circuit for producing the mode control signal.

On the other hand, the control signals are selectively sent as upstream control signals UC from the control signal transmitter/receiver 42 to the radio control unit 22 through the third gate 48 and the hybrid transformer 41 and are sent as transmission control signals TC from the control signal transmitter/receiver 42 direct to the radio transmitter/receiver 49. The control signal transmitter/receiver 42 is also supplied with reception control signals RC from each radio telephone set 16 through the radio transmitter/receiver 49.

The illustrated status control storage 44 comprises a telephone number memory 51 for memorizing a telephone number signal representative of a telephone number assigned to a radio telephone set which is in the course of communication, a CE number memory 52 for memorizing a CE number signal representative of a CE number assigned to the illustrated connecting equipment unit 23, and a system identification memory 53 for memorizing a system identification number preassigned to the radio control unit 22. The telephone number memory 51 and the CE number memory 52 may be random access memories while the system identification memory 53 may be a read-only memory.

The CE number signal and the telephone number signal are sent through the equipment unit controller 43, the control signal transmitter/receiver 42, the third gate 48, and the hybrid transformer 41 to the radio control unit 22 to be stored or registered in the position administration table 36. Such a registered CE number corresponding to each radio telephone set 16 is renewed to another one from time to time. In order to renew each CE number signal, poling operation may be carried out in a known manner. Consequently, the CE number signal and the telephone number signal serve to determine each position of the radio telephone sets 16 in the radio control unit 22.

It is mentioned here that the mode data signal is read out of the mode administration table 31 to be delivered as the mode control signal through the hybrid transformer 41 and the control signal transmitter/receiver 42 to the equipment unit controller 43 of FIG. 5. Supplied with the mode control signal, the equipment unit controller 43 puts the illustrated connecting equipment unit 23 into a selected one of the first through the third modes M1 to M3 described with reference to FIG. 2. When the mode control signal representative of the first mode M1, a power source (not shown) energizes the equipment unit controller 43, the control signal transmitter/receiver 42, and the radio transmitter/receiver 49, with the third gate 48 opened and with the first and the second gates 46 and 47 closed. Accordingly, the control channel is monitored by the equipment unit controller 43 through the radio transmitter/receiver 49 and the control signal transmitter/receiver 42. As a result, the transmission and the reception control signals TC and RC are produced and received by the control signal transmitter/receiver 42. The reception control signals RC may be transmitted as the upstream control signals UC through the control signal transmitter/receiver 42 and the third gate 48 towards the radio control unit 22. When the mode control signal is representative of the second mode M2, the control signal transmitter/receiver 42, the radio transmitter/receiver 49, and the equipment unit controller 43 are energized by the power source with all of the first through third gates 46 to 48 closed. Inasmuch as the third gate 48 is also closed in response to the mode control signal of the second mode M2, the reception control signals RC are not transmitted as the upstream control signals UC to the radio control unit 22 in the second mode M2, although the radio channel is monitored by the equipment unit controller 43, as mentioned before.

Furthermore, the first and the second gates 46 and 47 are opened with the third gate 48 closed when the mode control signal is indicative of the third mode M3. As a result, the speech signals are transmitted through the first and the second gates 46 and 47.

Figure 6:
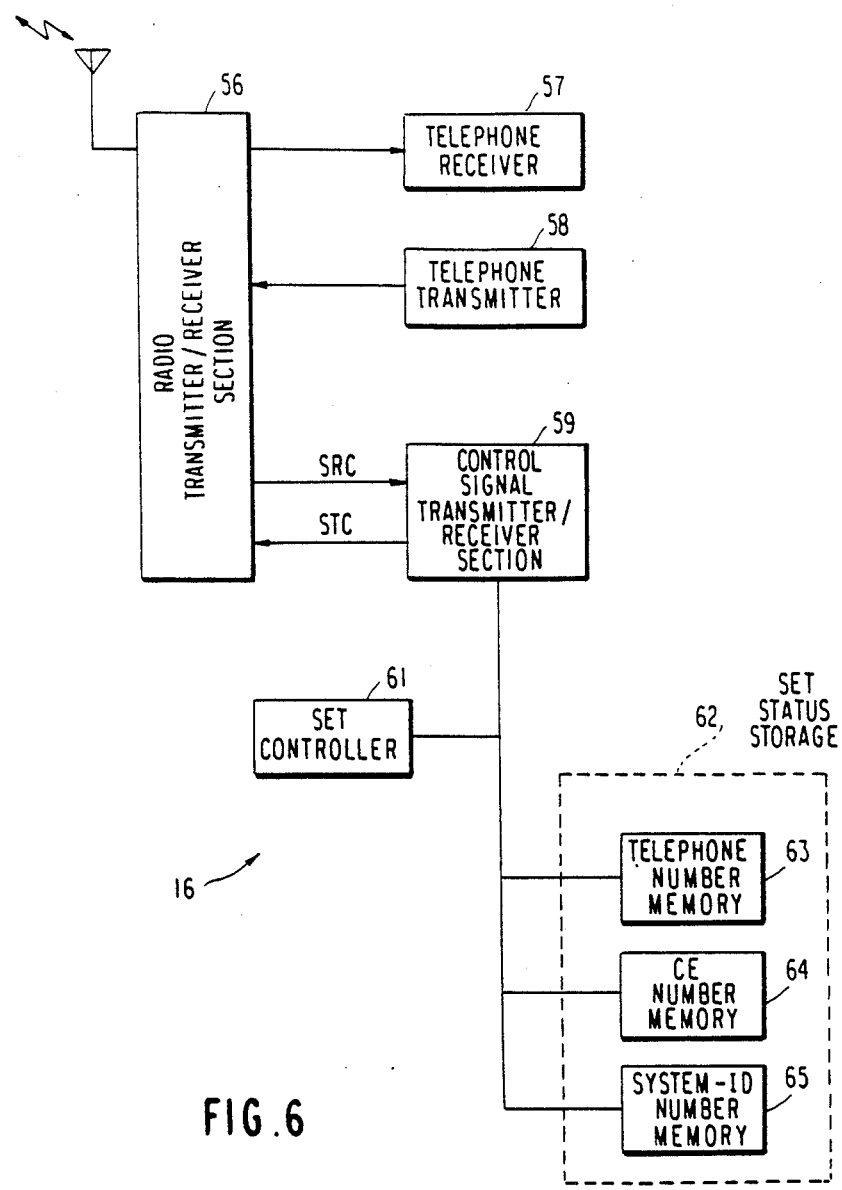
FIG. 6 is a block diagram of a radio telephone set which can be used in the radio communication network system.

Referring to FIG. 6, the radio telephone set 16 comprises a radio transmitter/receiver section 56 coupled to a telephone receiver 57, and a telephone transmitter 58. The radio transmitter/receiver section 56 is also coupled to a control signal transmitter/receiver section 59 which may be similar in structure and operation to the control transmitter/receiver 42 (FIG. 5) of the connecting equipment unit 23. The control signal transmitter/receiver section 59 is supplied as set reception control signals SRC with the transmission control signals TC (FIG. 5) through the control channel and sends set transmission control signals STC to the radio transmitter/receiver section 56 under control of a set controller 61. The set controller 61 is coupled to both the control signal transmitter/receiver section 59 and a set status storage 62 through a control line. The set status storage 62 comprises a telephone number memory 63, a CE number memory 64, and a system identification number memory 65 which correspond to the telephone number memory 51, the CE number memory 52, and the system identification number memory 53 illustrated in FIG. 5, respectively. The telephone number memory 63 memorizes a telephone number assigned to the radio telephone set 16 while the CE number memory 64 memorizes a CE number assigned to a connecting equipment unit which is in course of communication. In addition, the system identification number memory 65 memorizes a system identification number which is identical with that memorized in the system identification number memory 53 of FIG. 5. The telephone number memory 63 and the system identification number memory 65 may be formed by read-only memories while the CE number memory 64 may be a random access memory.

Figure 7:
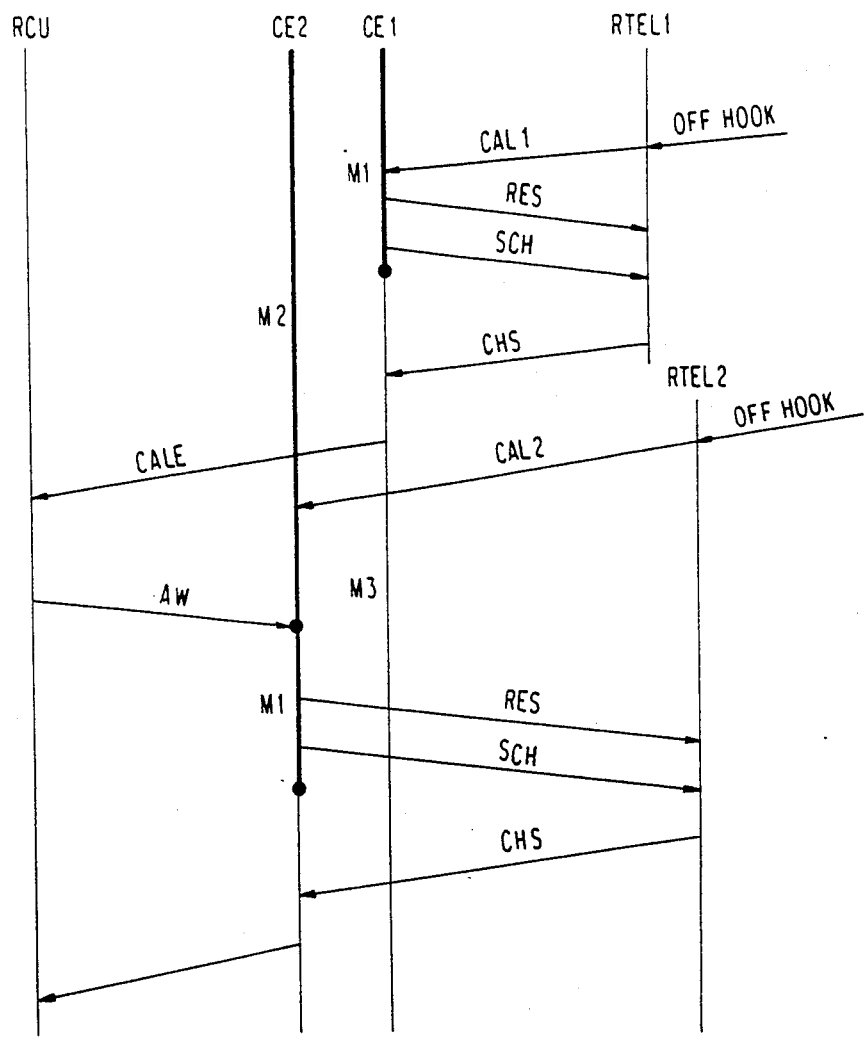
FIG. 7 is a flow chart for use in describing operation of the radio control unit, the connecting equipment units, and the radio telephone set.

Referring to FIG. 7 together with FIG. 1 and FIGS. 4 through 6, call processing operation will be described on the assumption that preceding and following originating calls occur from first and second radio telephone sets 16 that are present in the service zone of the first radio connecting section 211 (FIG. 1) and that are depicted at RTEL1 and RTEL2 in FIG. 7, respectively. In addition, it is further assumed that the first radio connecting section 211 only comprises first and second connecting equipment units which are depicted at CE1 and CE2 in FIG. 7, respectively, and which are put into the first and the second modes M1 and M2 on occurrence of the preceding originating call, as shown by thick lines in FIG. 2, respectively.

In this situation, the preceding originating call is received by the first connecting equipment unit CE1. Specifically, the first telephone set RTEL1 goes off hook on the preceding originating call and sends a first calling signal CAL1 through the control channel to the first radio connecting section 211. The calling signal CAL1 is produced as a part of the set transmission control signals STC (FIG. 6) by the first radio telephone set 16. In the first radio connecting section 211, the first connecting equipment unit CE1 receives the first calling signal CAL1 as a part of the reception control signals RC and sends a response signal RES and a speech channel (S—CH) indication signal SCH as the transmission control signals TC back to the first radio telephone set RTEL1. The speech channel indication signal SCH is indicative of a selected one of the speech channels. After transmission of the response signal RES and the speech channel indication signal SCH, the first connecting equipment unit CE1 is turned into the third mode M3 wherein the first connecting equipment unit CE1 switches from the control channel to the selected speech channel by opening the first and the second gates 46 and 47 (FIG. 5) with the third gate 48 closed, as shown by a downwardly extended thin line in FIG. 7. Responsive to the response signal RES and the speech channel indication signal SCH, the first radio telephone set RTEL1 supplies the first connecting equipment unit CE1 with a channel switch signal CHS representing that switching is completed in the first radio telephone set RTEL1 from the control channel to the selected speech channel. Supplied with the channel switch signal CHS, the first connecting equipment unit CE1 transmits an equipment unit calling signal CALE to the radio control unit 22. After the radio control unit 22 is sent to the equipment unit calling signal CALE and supplies the second connecting equipment unit CE2 with an allowance signal AW indicative of allowance of call processing in the second connecting equipment unit CE2, the second connecting equipment unit CE2 is switched from the second mode M2 to the first mode M1 under control of the radio control unit 22, as illustrated in FIG. 7. In the example being illustrated, the second radio telephone set RTEL2 goes off hook and produces a second calling signal CAL2 on occurrence of the following originating call before the allowance signal AW is not received by the second connecting equipment unit CE2. Under the circumstances, the second calling signal CAL2 is received by the second connecting equipment unit CE2 without being subjected to call processing. This shows that no response signal is produced before reception of the allowance signal AW.

As soon as the allowance signal AW is received, the second connecting equipment unit CE2 is switched from the second mode M2 to the first mode M1 to start the call processing of the following originating call. Thus, the allowance signal AW alone is transmitted from the radio control unit 22 to the second connecting equipment unit CE2 on switching from the second mode M2 to the first mode M1. Therefore, such a switching operation is quickly carried out in the illustrated example. After reception of the allowance signal AW, a response signal RES, a speech channel indication signal SCH, and a channel switch signal CHS are transmitted between the second connecting equipment unit CE2 and the second radio telephone set RTEL2 like in the preceding originating call.

Similar operation is carried out when a preceding call is a terminating call for calling a radio telephone set and is followed by a following call which is an originating call from another radio telephone set.

Figure 8:
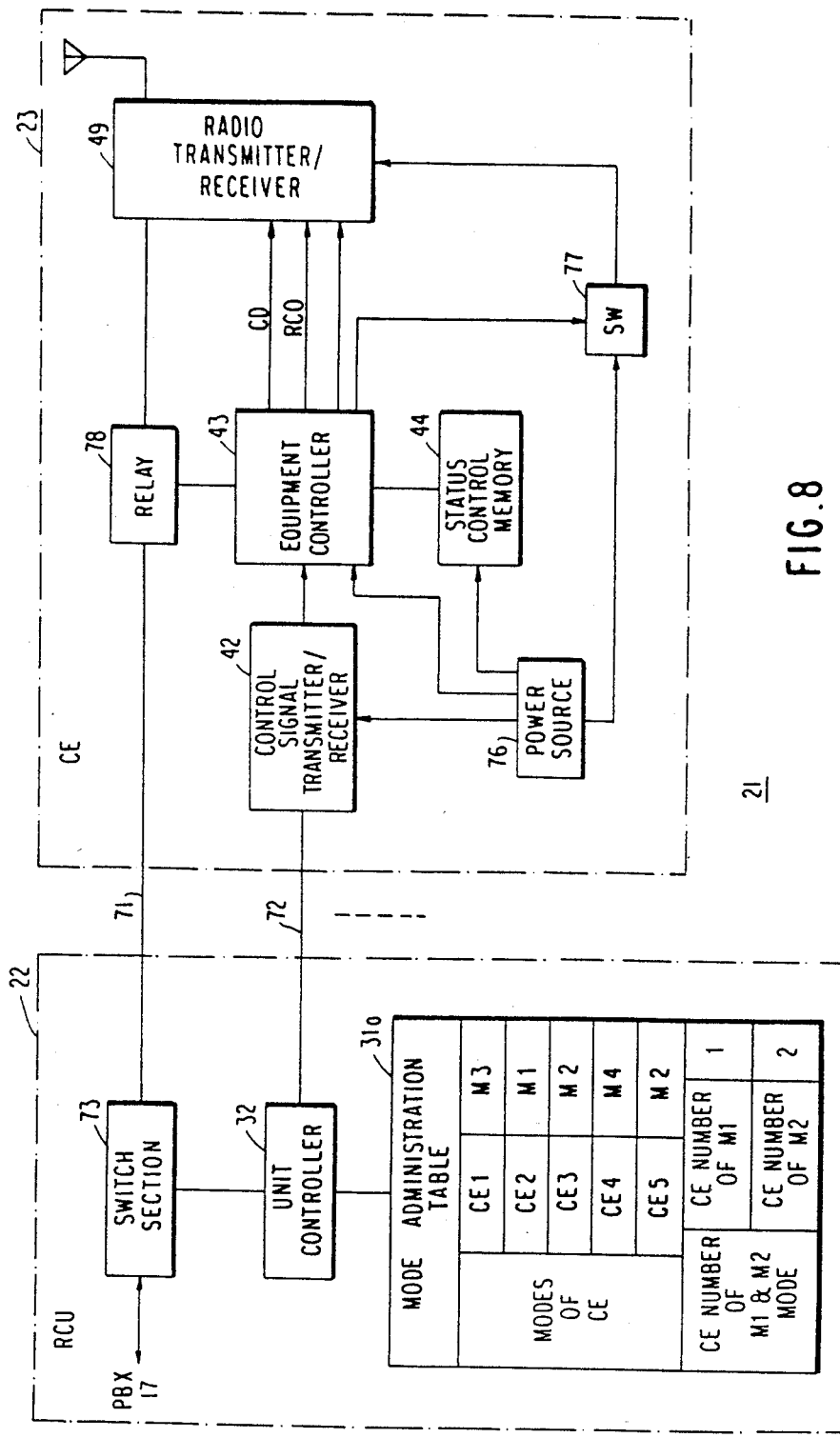
FIG. 8 is a block diagram of a radio communication network system according to a second embodiment of this invention.

Referring to FIG. 8, a radio communication network system according to a second embodiment of this invention comprises a radio control unit 22 and a radio connecting section 21 which may be considered as a representative of a plurality of connecting sections. It is assumed that first through fifth ones of connecting equipment units (depicted at CE1 to CE5) are included in the illustrated connecting section 21 having a predetermined service zone, although only one of the connecting section 23 alone is illustrated in FIG. 8. In the example being illustrated, the radio control unit 22 and the connecting equipment unit 23 are individually connected through a speech path 71 and a control path 72, unlike in FIG. 1. For brevity of illustration, the radio control unit 22 is simply shown by a unit controller 32, a mode administration table 31a, and a switch section 73. The switch section 73 may be substantially equivalent to a combination of the digital matrix switch 33, the EX interfaces 38, and the CE interfaces 34 which are illustrated in FIG. 4. The unit controller 32 may be a control section and a control signal transmitter/receiver.

The illustrated system can be simply specified by the mode administration table 31a in the radio control unit 22. As represented by the connecting equipment unit 23 in FIG. 8, each of the first through fifth connecting equipment units CE1 to CE5 comprises a power source 76, a power switch (SW) 77, and a line relay 78 in addition to similar parts designated in FIG. 5 by like reference numerals. The relay 78 may be equivalent to a combination of the first and the second gates 46 and 47.

Figure 9:
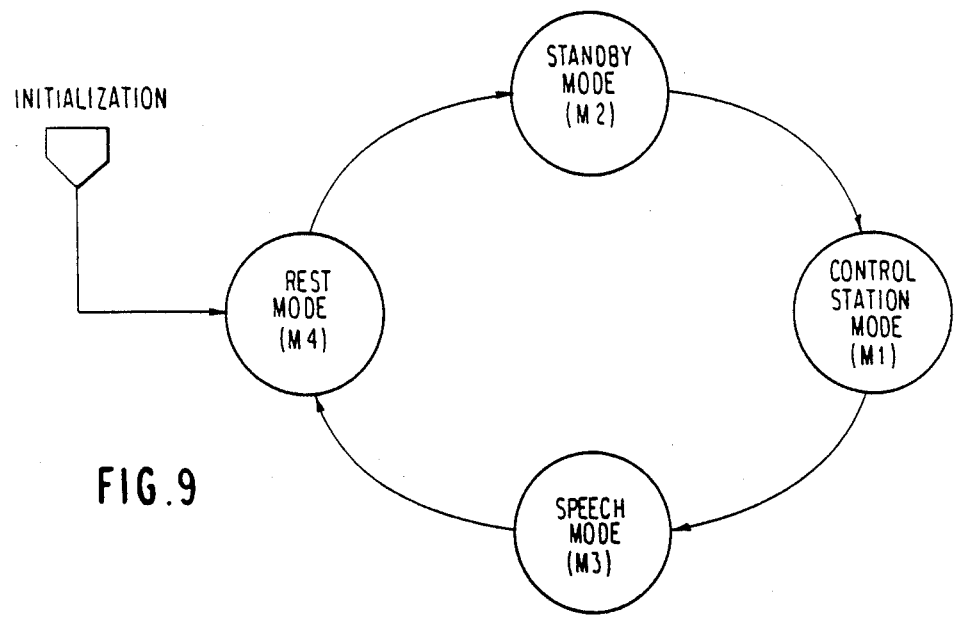
FIG. 9 is a state transition diagram for use in describing operation of each connecting equipment unit illustrated in FIG. 8.

Referring to FIG. 9 together with FIG. 8, the mode administration table 31a is installed in the radio control unit 22 so as to administrate each connecting equipment unit 23 in a manner illustrated in FIG. 9. It may be assumed that the first through the fifth connecting equipment units CE1 to CE5 are placed in the service zone determined in relation to the illustrated radio connecting section 21 and administrated in accordance with the mode administration table 31a. In the illustrated system, it is to be noted that only one of the connecting equipment units CE1 to CE5 is put into a mode or state of monitoring the control channel in accordance with the mode administration table 31a. Such a mode is similar to the first or allowance mode described with reference to FIG. 2 and may be called a control station mode M1. The first through fifth connecting equipment units CE1 to CE5 are successively put into the control station mode M1 one at a time in response to the mode control signal sent from the unit controller 32 through the control path 72.

In addition, each of the first through fifth connecting equipment units CE1 to CE5 can be selectively put into a rest mode, a standby mode, and a speech mode. The standby mode and speech mode are identical with those illustrated in FIG. 2, respectively, and may therefore be represented by M2 and M3, respectively, while the rest mode may be represented by M4.

As shown in FIG. 9, operation of each connecting equipment unit is started from the rest mode M4 to the control station mode M1 through the standby mode M2 and switched from the control station mode M1 to the speech mode M3. Thereafter, the speech mode M3 is turned back to the rest mode M4. Such operation is cyclically and successively carried out in each connecting equipment unit 23 under control of the radio control unit 22. Specifically, when the mode control signal is indicative of the rest mode M4 and is received through the control signal transmitter/receiver 42 by the equipment unit controller 43, the equipment unit controller 43 alone is energized by the power source 76 with the radio transmitter/receiver 49 deenergized by the power switch 77. Each connecting equipment unit also takes the rest mode M4 on initialization.

The rest mode M4 is shifted to the standby mode M2 in response to the mode control signal representative of transition from the rest mode M4 to the standby mode M2. In the standby mode M2, the power switch 77 is turned on to supply electric power from the power source 76 to the radio transmitter/receiver 49. As a result, the equipment unit controller 43 retrieves or searches for an idle one of the speech channels through the radio transmitter/receiver 49 to store an idle channel number into the status control memory 44 which is also loaded with a telephone number, a CE number, and a system identification number, like in FIG. 5. The retrieval of an idle channel is made by successively delivering a radio control signal RCO to the radio transmitter/receiver 49.

When the control equipment unit 23 is supplied from the unit controller 32 with the mode control signal which is indicative of transition from the standby mode M2 to the control station mode M1 and which may be identical with the allowance signal AW (FIG. 7), the connecting equipment unit 23 is switched from the standby mode M2 to the control station mode M1. In this event, the equipment unit controller 43 supplies the radio telephone sets (FIG. 1) through the radio transmitter/receiver 49 with a channel data signal CD indicative of the above-mentioned transition of the connecting equipment unit 23. During the control station mode M1, the connecting equipment unit 23 waits for a call processing request for call processing.

When the connecting equipment unit 23 receives the call processing request, the equipment unit controller 43 supplies the radio telephone sets with a switch indication signal representative of an indication of switching from the control channel to an idle one of the speech channels. On the other hand, the equipment unit controller 42 supplies the unit controller 32 with a completion signal representative of completion of the call processing. Thereafter, the connecting equipment unit 23 is switched from the control station mode M1 to the speech mode M3 which is switched to the idle speech channel.

During the speech mode M3, conversation or communication is made in a usual manner. The speech mode M3 is returned back to the rest mode M4 by turning the power switch 77 into an off-state when the communication is finished.

Figure 10:
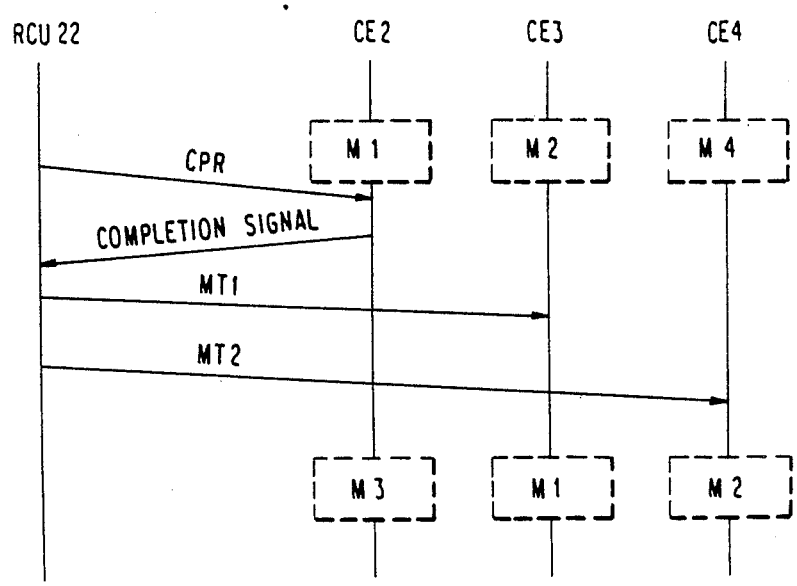
FIG. 10 is a flow chart for use in describing a relationship of operation among the radio control unit and the connecting equipment units.
Figure 11:
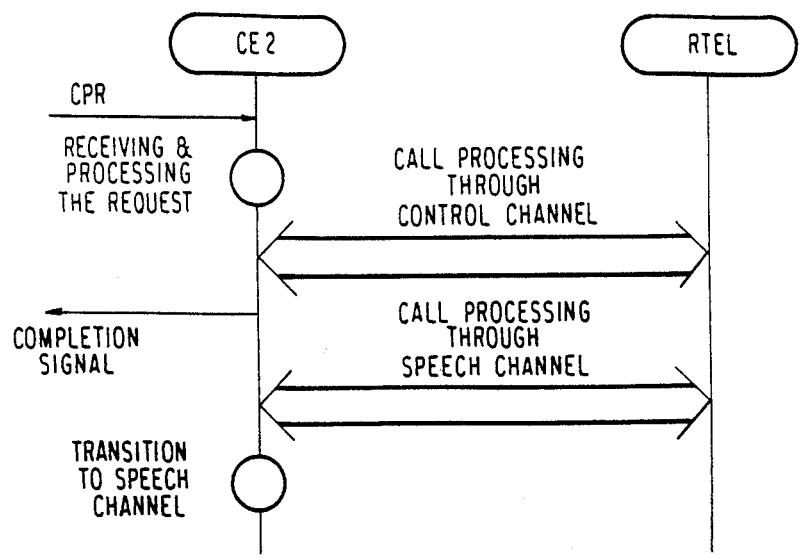
FIG. 11 is another flow chart for use in describing another relationship of operation between one of the connecting equipment unit and the radio telephone set.

Referring to FIGS. 10 and 11 together with FIG. 8, description will be made about a mutual relationship of operations among the first through fifth connecting equipment units CE1 to CE5 on the assumption that the mode administration table 31a of the radio control unit 22 is loaded with mode control signals as illustrated in FIG. 8. In this event, the first through fifth connecting equipment units CE1 to CE5 are put into the speech mode M3, the control station mode M1, the standby mode M2, the rest mode M4, and the standby mode M2, respectively. In this situation, it is presumed that a terminating call is sent from a private branch exchange or so to the radio control unit 22. The unit controller 32 refers to the mode administration table 31a to supply the second connecting equipment unit CE2 of the control station mode with a call processing request signal CPR representative of a call processing request, as shown in FIG. 10. Such a call processing request signal may be produced as the mode control signal. The resultant second connecting equipment unit CE2 is put into a state of receiving the call processing request and is turned into a call processing state so as to process the terminating call by the use of the control channel, as shown in FIG. 11. In other words, the call processing is carried out in the second connecting equipment unit CE2 through the control channel by producing the channel switch signal for switching to an indicated one of the speech channels. Thereafter, the second connecting equipment unit CE2 supplies the radio control unit 22 with a completion signal indicative of completion of the call processing through the control channel signal. After production of the completion signal, the second connecting equipment unit CE2 is switched to the speech mode M3 to carry out the call processing through the indicated speech channel, as shown in FIG. 11. The first and fifth connecting equipment units CE1 and CE5 will be irrespective of the following description and will not be shown in FIG. 10.

When the completion signal is produced from the second connecting equipment unit CE2 on completion of the call processing through the control channel, the radio control unit 22 supplies the third connecting equipment unit CE3 of the standby mode with the mode control signal which is indicative of transition from the standby mode M2 to the control station mode M1 and which may be called a first mode transition signal depicted at MT1 in FIG. 9. Moreover, the radio control unit 22 supplies the fourth connecting equipment unit CE4 of the rest mode as the mode control signal with a second mode transition signal which is representative of transition from the rest mode to the standby mode.

The third and the fourth connecting equipment units CE3 and CE4 are turned into the control station mode M1 and the standby mode M2 in response to the first and the second mode transition signals MT1 and MT2, respectively, as shown in FIG. 9. On the other hand, the mode administration table 31a of the radio control unit 22 and each status control memory 44 of the connecting equipment units 23 are rewritten in consideration of transition of the modes as mentioned above. This makes it possible for the system to respond to a following call.

Thus, each connecting equipment unit is selectively switched from the control station mode M1 to the speech mode M3 in the above-mentioned system. Such selective switching makes high speed transmission of data signals unnecessary between the radio control unit 22 and each connecting equipment unit 23. This means that control operation becomes simple in the radio control unit 22. In addition, each connecting equipment unit is put into the standby mode M2 after the rest mode M4. This shows that each connecting equipment unit may be slowly put into the standby mode M2 after the power source 76 is turned on. This shows that no quick response is required in each connecting equipment unit. Only one connecting equipment unit may be placed in a service zone where traffic is not heavy.

Figure 13:
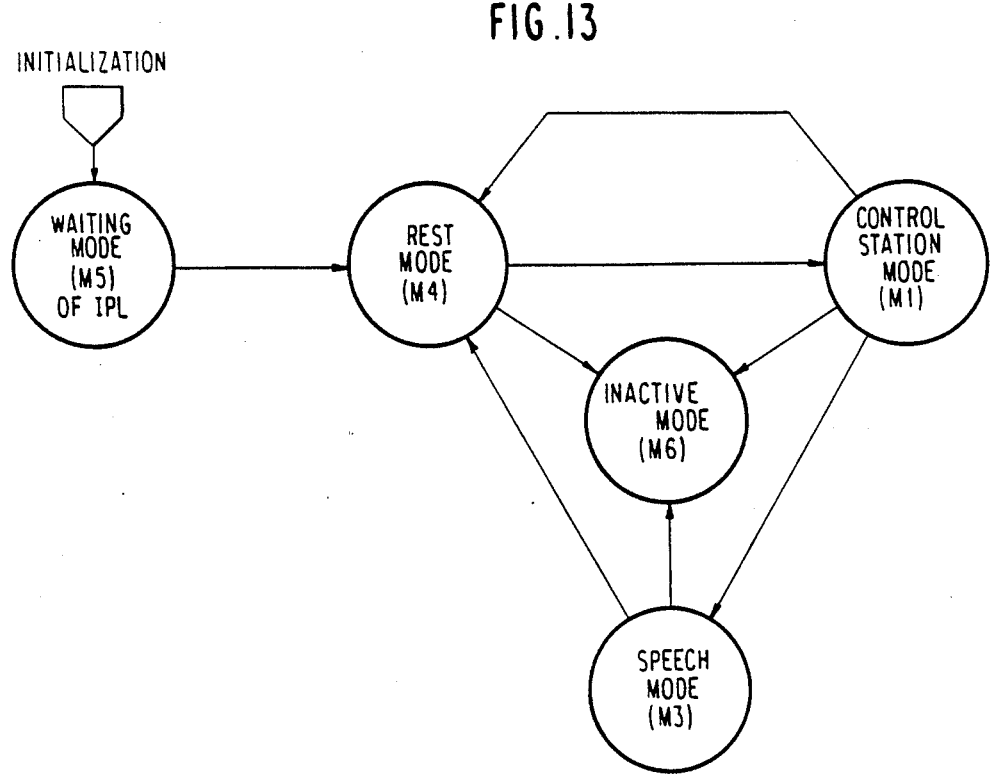
FIG. 13 is a state transition diagram for use in describing operation of the connecting equipment unit illustrated in FIG. 12.
Figure 12:
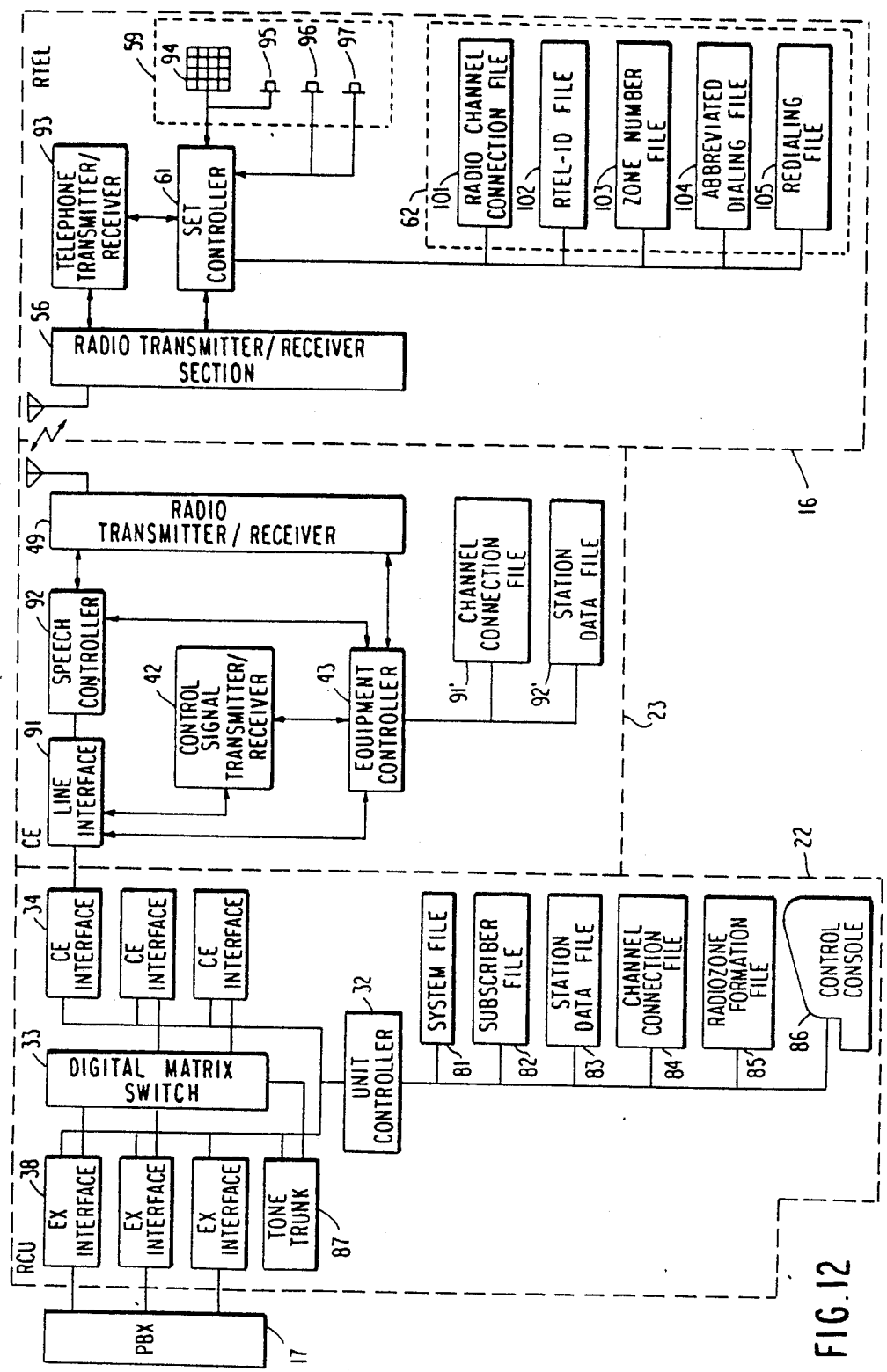
FIG. 12 is a block diagram of a radio communication network system according to a third embodiment of this invention.
Figure 14A:
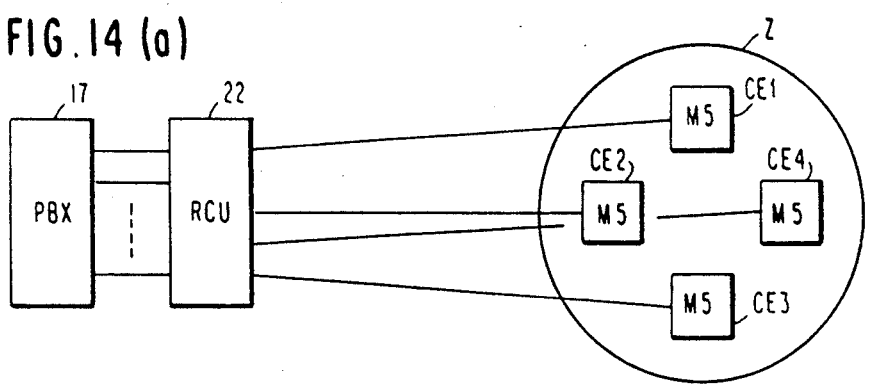
FIGS. 14(a) through (c) are block diagrams for use in operation of the radio communication network system illustrated in FIG. 12.
Figure 14B:
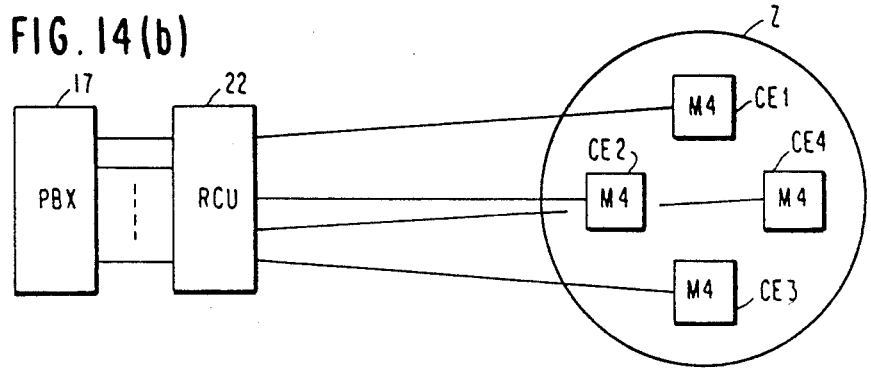
Figure 14C:
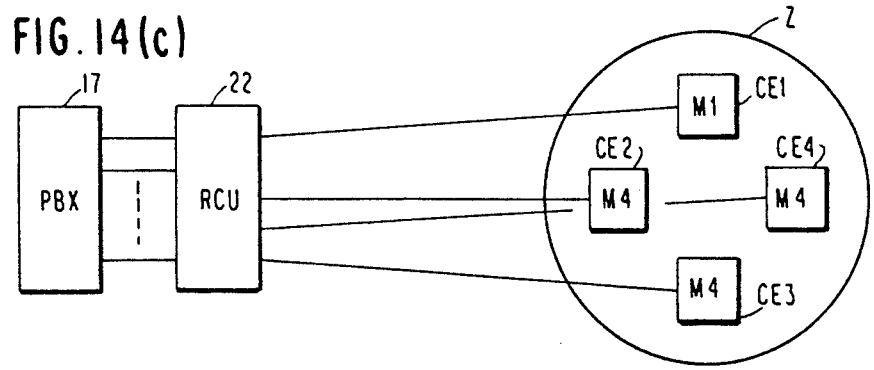

Referring to FIGS. 12, 13, and 14, a radio communication network system according to a third embodiment of this invention comprises a plurality of connecting equipment units (CE) each of which is operable in a manner illustrated in FIG. 13 under control of a radio control unit (RCU) 22. The radio communication network system illustrated in FIG. 12 carries out operations in a manner illustrated in FIG. 13. As shown in FIG. 13, each connecting equipment unit CE of FIG. 13 is different from that illustrated in FIG. 9 in that the former is put into a waiting mode M5 of initial program loading (IPL) on initialization of the connecting equipment unit CE or the network system and is directly switched from the rest mode M4 following the waiting mode M5 to the control equipment or station mode M1 without the standby mode M2 (FIG. 9). In addition, the illustrated connecting equipment unit CE can be switched from each of the rest mode M4, the control station mode M1, and the speech mode M3 to an inactive mode M6 into which the connecting equipment unit CE is put on occurrence of a fault of malfunction therein. In FIG. 14, it is assumed that first through fourth ones of the connecting equipment units CE (depicted at CE1 to CE4 in FIG. 14) are operable in the manner illustrated in FIG. 14 and are located in a common single service zone Z, as shown in FIG. 14. Operations of the first through fourth connecting equipment units CE1 to CE4 will be described in relation to a radio control unit 22 and a private branch exchange 17 in FIGS. 14(a) to 14(i).

Assume that a condition exists in which all of the first through fourth connecting equipment units CE1 to CE4 are turned on by the power sources and are put into the waiting modes M5 of the initial program loading, as shown in FIG. 14(a). During the waiting mode M5, an initial program is sent from the radio control unit 22 to the respective connecting equipment units CE1 to CE4. The initial program comprises a program for operating each connecting equipment unit and a data signal set stored into the status control memory 44 (FIG. 5) and is delivered from the radio control unit 22 in the form of an IPL data signal. Such an IPL data signal will be described later again.

After the initial program loading is finished, the first through fourth connecting equipment units CE1 to CE4 are changed from the waiting modes M5 to the rest modes M4 which may be similar to that described in conjunction with FIG. 9, as shown in FIG. 14(b). In this event, each connecting equipment unit CE (suffixes omitted) produces a response signal representative of completion of the initial program loading in the order of completion of the loading. Thus, the response signals are successively received from the respective connecting equipment units CE1 to CE4 by the radio control unit 22 and are therefore composed of a first arrival signal to a last arrival one. Responsive to the response signals, the radio control unit 22 determines a control equipment unit or station which is to be turned into the control station mode M1. The illustrated radio control unit 22 decides, as the control station, the connecting equipment unit from which the first arrival signal is received. When the first arrival signal is produced from the first connecting equipment unit CE1, the radio control unit 22 supplies the first connecting equipment unit CE1 with a command which indicates transition from the rest mode M4 to the control station mode M1. As a result, the first connecting equipment unit CE1 is changed to the control station mode M1 with the remaining equipment units CE2 to CE4 kept in the rest modes M4, as shown in FIG. 14(c), and thereafter acts as a control equipment unit or station in the illustrated service zone Z. Thereafter, the radio control unit 22 successively indicates each of the first through fourth connecting equipment units CE1 to CE4 as the control station in a predetermined order of, for example, CE1, CE2, CE3, and CE4 each time when a preselected rotation period of, for example, 6 minutes lapses.

Under the circumstances, when a call takes place, the radio control unit 22 changes the first connecting equipment unit CE1 of the control station mode M1 to the speech mode M3. In this event, the second connecting equipment unit CE2 is switched from the rest mode M4 to the control station mode M1. Similar operation is successively carried out among the first through fourth connecting equipment units CE1 to CE4 under control of the radio control unit 22. It is to be noted that each connecting equipment unit CE is turned into the rest state M4 after the speech mode M3, as shown in FIG. 13, and that each connecting equipment unit CE is monitored by the radio control unit 22 to be judged as a malfunction when no acknowledgement is returned back from each connecting equipment unit CE to the radio control unit 22 in response to a control signal within a prescribed interval of time. When the malfunction is removed, each connecting equipment unit CE is put into the waiting mode M5. In addition, when one of the connecting equipment units to be put into the control station mode M1 actually takes the speech mode M3, another connecting equipment unit CE of the rest mode M4 is indicated as a following control station.

The above-mentioned operations are accomplished by the use of the radio communication network system of FIG. 12 which comprises similar parts designated by like reference numerals. More particularly, the illustrated radio control unit 22 is specified by a system file 81, a subscriber file 82, a station data file 83, a channel connection file 84, a radio zone formation file 85, and a control console 86. In FIG. 12, a tone trunk 87 is also illustrated and is helpful to produce various kinds of tones. The remaining parts are similar to those of FIG. 4 and will therefore not be described later any longer.

The system file 81 is loaded with a system identification number (system-id) assigned to the radio control unit 22, a system capacity representative of subscribers of a number which can be accommodated, the number of the control equipment units or stations equal to that of service zones, and control data signals of the rotation period and a monitoring timer value. The control data signals serve to switch the modes of the connecting equipment units CE from one to another at the predetermined rotation period and to judge whether or not a malfunction takes place in each connecting equipment unit CE. Moreover, the system file 81 stores a program to operate the connecting equipment units CE and any other data signals to be sent to the connecting equipment units CE.

The subscriber file 82 is loaded with a subscriber number preassigned to each radio telephone set 16, a telephone identification number (RTEL-ID) for each radio telephone set 16, a position data signal, and a subscriber class. The position data signal is representative of a present position of the radio telephone set 16 and may be specified by the number given to a service zone or so. The position data signal is rewritten each time when the radio telephone set 16 is moved from one service zone to another one.

The station data file 83 is loaded with numbers assigned to external lines and radio channels and channel status signals representative of whether each radio channel is used, unused, or closed. The channel connection file 84 is loaded with a connection data signal related to a present call which is in course of communication. Such a connection data signal of the present call may be a subscriber number, an external line number, a connecting equipment line number, a call distinction signal representative of either a terminating call or an originating call, and a communication time. In addition, the radio zone formation file 85 is loaded with a service zone number assigned to each service zone, a number of the connecting equipment units placed in each service zone, and an equipment identification number assigned to each connecting equipment unit. The control console 86 is manually operable by an operator so as to store various data signals into the above-mentioned files and is helpful to monitor each result of monitoring the connecting equipment units CE.

The illustrated connecting equipment unit CE 23 comprises a line interface 91 and a speech controller 92 which may be similar to the hybrid transformer 41 and the first and the second gates 46 and 47 which are disclosed in FIG. 5, respectively. The line interface 91 and the speech controller 92 are controlled by the equipment unit controller 43 together with the control signal transmitter/receiver 42 in a manner similar to that illustrated in FIG. 5. The connecting equipment unit 23 is specified by a channel connection file 91' and a station data file 92'. The channel connection file 91' is loaded with a present state of the connecting equipment unit 23 in question, a telephone identification number (RTEL-ID) which is being connected, a connection control sequence of processing an originating call and a terminating call, a radio channel control signal for controlling the radio channels, and a line control signal for connection of the radio control unit 22. The station data file 92' is loaded with the system identification number preassigned to the radio control unit 22, the zone number of the service zone at which the connecting equipment unit 23 in question is placed, an equipment identification number, and a retrieval period for retrieving an idle channel. The initial program loading (IPL) may be carried out in the above-mentioned manner in relation to each of the channel connection file 91' and the station data file 92'.

In FIG. 12, the illustrated radio telephone set 16 comprises a radio transmitter/receiver 56 of a multichannel access type, a telephone transmitter/receiver depicted at a single block 93, a set controller 61, a control signal transmitter/receiver section 59, and a set status storage 62, like in FIG. 6. The control signal transmitter/receiver section 59 comprises a dial key 94, a hook switch 95, a position registration button 96, and a PB/DP switch button 97. The position registration button 96 is depressed by a user or possessor on position registration of the radio telephone set 16 into the subscriber file 82 of the radio control unit 22 while the PB/DP switch button 97 is switched in consideration of the private branch exchange 17 which uses either a push button signal or a dial pulse signal.

The set status storage 62 is also specified by a radio channel connection file 101, a radio telephone identification number file (RTEL-ID) 102, a zone number file 103, an abbreviated dialing file 104, and a redialing file 105. The radio channel connection file 101 is loaded with connection status of the radio telephone set 16, the equipment number connected to the telephone set 16, the system identification number preassigned to the radio control unit 22 connected to the telephone set 16, a sequence of connection data signals for connection of the radio telephone set 16 to the connecting equipment units, and a sequence of control signals. The radio telephone identification number file 102 stores a radio identification number assigned to the radio telephone set 16 while the zone number file 103 is loaded with a service zone at which the radio telephone set 16 is present. The remaining files 104 and 105 are known in the art and will therefore not be described later.

With this structure, it is possible for the radio telephone set 16 to register its position into the subscriber file 82. As mentioned before, the position of the radio telephone sets 16 is specified by the service zone at which the radio telephone set 16 is present.

In this event, the position registration button 96 is at first depressed to put the set controller 61 into an active state. The set controller 61 turns the radio transmitter/receiver section 56 into an on-state to access the radio channel connection file 101 and the radio telephone identification number 102. As a result, a position registration request signal and the radio telephone identification number are produced in accordance with the connection data signals and the control signals stored in the radio channel connection file 101. The position registration request signal and the radio telephone identification number are sent through the radio transmitter/receiver section 56 and are received by connecting equipment units which are operable as the control stations in the service zones, respectively. The position registration request signal and the radio telephone identification number appear at the respective control stations with signal reception levels different from one another. Each control station encodes each signal reception level into an encoded reception level in accordance with the control signals read out of the channel connection file 91' to close a transmission line connected to the radio control unit 22 in compliance with the control sequence read out of the channel connection file 91'. Thereafter, each control station transmits or sends the encoded reception level to the radio control unit 22 together with the position registration signal and the radio telephone identification number through the control signal transmitter/receiver 42 and the line interface 91. After the above-mentioned transmission of the encoded reception level and so on, each control station opens the transmission line connected to the radio control unit 22. Each encoded reception level may be represented, for example by two bit signals, such as "00", "01", "10", and "11" which may be made to correspond to a first level less than 20 dB, a second level between 20 and 40 dB, a third level between 40 and 60 dB, and a fourth level greater than 60 dB, respectively. Alternatively, each encoded reception level may be represented by three bit signals which can specify eight levels.

In the radio control unit 22, the unit controller 32 compares the encoded reception levels received from the respective control stations to select a highest one of the encoded reception levels and to judge that the radio telephone set 16 is present in the service zone specified by the highest encoded reception level. As a result, the position data signal corresponding to the above-mentioned service zone is stored in the subscriber file 82. If the encoded reception levels are equal to one another, the radio control unit 22 may decide the position of each radio telephone unit 16 in consideration of either a degree of priority predetermined for the connecting equipment units.

At any rate, the unit controller 32 transmits a registration completion signal to the connecting equipment unit from which the highest encoded reception level is given. The registration completion signal is sent to the above-mentioned connecting equipment unit by inverting a polarity of an electric voltage on the transmission line connected to the connecting equipment unit in question. In this case, the registration completion signal is not sent to the other connecting equipment units except the connecting equipment unit of the highest encoded reception level. Responsive to the registration completion signal, the connecting equipment unit converts the registration completion signal into a radio signal which is delivered to the radio telephone set 16. The registration completion signal may be reproduced by the telephone transmitter/receiver 93 in the form of an audio signal or may be displayed by the use of a light emitting diode or the like. In this case, the zone number file 103 of the radio telephone set 16 is loaded with the radio zone number assigned to the connecting equipment unit which produces the registration completion signal.

Subsequently, the radio telephone set 16 transmits a confirmation signal indicative of confirmation of registration to the radio control unit 22 through the connecting equipment unit 23. As a result, the polarity of the electric voltage is restored by the radio control unit 22.

The position registration request may be informed by opening and closing a transmission loop. The registration completion may be informed either by inverting a polarity of an electric voltage given to the transmission line between the radio control unit 22 and the connecting equipment unit 23 or by transmitting a tone signal to the radio telephone set 16.

It is possible to process a terminating call to the radio telephone set 16 and an originating call from the radio telephone set 16 in a manner similar to that illustrated in conjunction with FIGS. 8 through 11. Therefore, description will be omitted in FIG. 12.

While this invention has thus far been described in conjunction with a few embodiments thereof, it will readily be possible for those skilled in the art to put this invention into practice in various other manners. For example, a single one of the connecting equipment units may be located in a single service zone and controlled in a time division fashion when traffic is not so heavy. A mobile telephone set may be used instead of the cordless telephone set.

What is claimed is:

1. A control station for use in processing a call in a radio communication network system to carry out communication with a cordless telephone set movable in a service area defined by said control station, with a control radio channel and a plurality of speech radio channels preassigned to said control station, said control station comprising:
   a plurality of first means which have a common service zone and each of which is selectively operable in first and second control modes and a speech mode, each of said first means being for monitoring said control radio channel in said first and said second control modes to allow reception of said call in said first control mode and not to allow said reception of the call in said second control mode and for transmitting a speech signal in said speech mode through a selected one of said plurality of speech radio channels by forming a speech path through the selected one of said plurality of speech radio channels in said speech mode; and
   second means coupled to said plurality of first means for successively controlling said plurality of first means to switch either one of said first and said second control modes and said speech mode to another so that at least one of said plurality of first means is selectively kept in said second mode.

2. A control station as claimed in claim 1, wherein said second means comprises:
   administrating means for administrating which one of said first and said second control modes and said speech mode said second means selects; and
   control means coupled to said administrating means for controlling said plurality of first means by monitoring said administrating means and by producing a mode control signal representative of a selected one of said first and said second modes and said speech mode.

3. A control station as claimed in claim 2, wherein said plurality of first means comprises:
   mode control means responsive to said mode control signal for putting said plurality of first means to said selected one of the first and the second control modes and the speech mode.

4. A control station as claimed in claim 3, said plurality of first means forming a part of said speech path and a control signal path connected to said second means, wherein said plurality of first means comprises:
   gate means coupled to said mode control means for forming said speech path in said speech mode; and
   additional gate means coupled to said mode control means for forming said control signal path only in said first control mode without said control signal path being formed in said second control mode.

5. A control station as claimed in claim 1, wherein each of said first and said second control modes is for selectively monitoring said control and said speech radio channels.

6. A control station for use in processing a call in a radio communication network system to carry out communication with a cordless telephone set movable in a service area defined by said control station, with a control radio channel and a plurality of speech radio channels preassigned to said control station, said control station comprising:
   a plurality of radio channel connecting means which have a common service zone and each of which is selectively operable in a speech mode and an additional mode, each of said plurality of radio channel connecting means being for monitoring said control radio channel and to perform an additional operation in said additional mode, and to carry out communication through a selected one of said plurality of speech radio channels in said speech mode; and
   control means coupled to said plurality of radio channel connecting means for successively controlling said plurality of radio channel connecting means to select one of said speech mode and said additional mode so that at least one of said plurality of radio channel connecting means is selectively kept in said additional mode.

7. A control station as claimed in claim 6, wherein said additional mode comprises a rest mode of monitoring neither said control radio channel nor said plurality of speech radio channels, a standby mode of monitoring both said control and said plurality of speech radio channels without reception of said call, and a control station mode of allowing reception of said call by monitoring both said control and said plurality of speech radio channels.

8. A control station as claimed in claim 7, said plurality of radio channel connecting means comprising a power source for producing a source voltage, speech path controlling means coupled to said power source for forming said speech path in said speech mode, and interface means coupled to said speech path controlling means for selectively coupling said speech path controlling means to said control and said plurality of speech radio channels, wherein said radio channel connecting means comprises:
   interrupting means coupled to said power source, said speech path controlling means, and said interface means for interrupting supply of said source voltage to said interface means in said rest mode under control of said speech path controlling means.

9. A control station as claimed in claim 6, said radio channel connecting means being operable in accordance with a program, wherein said additional mode comprises a program loading mode of loading said program, a rest mode of monitoring neither said control radio channel nor said plurality of speech radio channels, a standby mode of monitoring both said control and said plurality of speech radio channels without reception of said call, and a control station mode of allowing reception of said call by monitoring both said control and said plurality of speech radio channels.

10. A radio communication network system for use in processing a call to carry out communication with a plurality of cordless telephone sets in a predetermined, common service zone through a speech path formed by the use of a control radio channel and a plurality of speech radio channels, said radio communication network system comprising:

a plurality of connecting equipment units which are located in said predetermined, common service zone and each of which is selectively operable in a speech mode for transmitting a speech signal in said speech mode through a selected one of said speech radio channels by forming said speech path through a selected one of said speech radio channels in said speech mode, and in an additional mode different from said speech mode; and control means coupled to said plurality of connecting equipment units for controlling said plurality of connecting equipment units to selectively put said plurality connecting equipment units into said speech mode and said additional mode so that at least one of said plurality of connecting equipment units is selectively kept in said additional mode.

11. A radio communication network system as claimed in claim 10, wherein said additional mode comprises a rest mode of monitoring neither said control radio channel nor said plurality of speech radio channels, a standby mode of monitoring both said control and said plurality of speech radio channels without reception of said call, and a control station mode of allowing reception of said call by monitoring both said control and said plurality of speech radio channels.

12. A radio communication network system as claimed in claim 11, wherein a selected one of said plurality of connecting equipment units alone is put into said control station mode in said predetermined, service zone.

* * * * *

UNITED STATES PATENT AND TRADEMARK OFFICE
CERTIFICATE OF CORRECTION

PATENT NO. : 4,939,785
DATED : July 3, 1990
INVENTOR(S) : Yoshitoshi MURATA, Masahiko HIRONO, Toshihiko SHIBATA and Fumio SUZUKI It is certified that error appears in the above-identified patent and that said Letters Patent is hereby corrected as shown below:

Col. 3, line 51, delete "21ℓ" and insert --211--;

line 53, delete "21ℓ" and insert --211--;

line 55, delete "21ℓ" and insert --211--.

Col. 4, line 10, delete "21ℓ" and insert --211--;

line 12, delete "23ℓ" and insert --231--;

line 17, delete "23ℓ" and insert --231--.

Col. 5, line 22, delete "21ℓ" and insert --211--.

Signed and Sealed this

Fifth Day of November, 1991

Attest:

HARRY F. MANBECK, JR.

*Attesting Officer*    *Commissioner of Patents and Trademarks*